(12) United States Patent
Miller et al.

(10) Patent No.: US 7,283,463 B2
(45) Date of Patent: Oct. 16, 2007

(54) NON-DISRUPTIVE RECONFIGURATION OF A PUBLISH/SUBSCRIBE SYSTEM

(75) Inventors: Kevan L. Miller, Danbury, CT (US); Robert E. Strom, Ridgefield, CT (US); Daniel C. Sturman, Englewood, NJ (US); Michael J. Ward, New Haven, CT (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 10/622,279

(22) Filed: Jul. 18, 2003

(65) Prior Publication Data

US 2004/0027995 A1    Feb. 12, 2004

Related U.S. Application Data

(63) Continuation of application No. 09/280,534, filed on Mar. 30, 1999, now abandoned.

(51) Int. Cl.
G01R 31/08 (2006.01)
G06F 11/00 (2006.01)
H04J 3/14 (2006.01)
H04L 1/00 (2006.01)
H04L 12/28 (2006.01)
H04L 12/26 (2006.01)
H04L 12/56 (2006.01)

(52) U.S. Cl. ................. 370/216; 370/254; 370/394
(58) Field of Classification Search ........ 370/216–218, 370/225, 254, 394
See application file for complete search history.

(56) References Cited

U.S. PATENT DOCUMENTS

| 5,257,369 A | 10/1993 | Skeen et al. |
| 5,325,362 A | 6/1994 | Aziz |
| 5,428,606 A | 6/1995 | Moskowitz ............... 370/400 |
| 5,517,562 A | 5/1996 | McConnell ................ 379/207 |
| 5,522,046 A | 5/1996 | McMillen et al. |
| 5,555,244 A | 9/1996 | Gupta et al. |
| 5,557,798 A | 9/1996 | Skeen et al. |
| 5,570,366 A | 10/1996 | Baker et al. |
| 5,581,764 A | 12/1996 | Fitzgerald et al. |
| 5,600,630 A | 2/1997 | Takano et al. ............. 370/218 |
| 5,604,867 A | 2/1997 | Harwood |
| 5,761,405 A | 6/1998 | Tadamura et al. ........... 714/18 |
| 5,870,605 A * | 2/1999 | Bracho et al. ............. 719/318 |

(Continued)

OTHER PUBLICATIONS

Hanson et al., "A Predicate Matching Algorithm for Database Rule Systems", Published at Proceedings of SIGMOD, pp. 271-280 (1991).

(Continued)

*Primary Examiner*—Kevin C. Harper
(74) *Attorney, Agent, or Firm*—Douglas W. Cameron, Esq.; Heslin Rothenberg Farley & Mesiti P.C.

(57) ABSTRACT

A publish/subscribe system is non-disruptively reconfigured, such that messages are not lost during the reconfiguration. After reconfiguration is initiated, messages that are to be delivered within the publish/subscribe system are forwarded using either an old path or a new path. That is, until the reconfigured system is stabilized, some messages may be delivered using the old path, while other messages are delivered using a new path. After the system is stabilized, the new path is used for delivery of all the messages, until another reconfiguration is initiated.

35 Claims, 12 Drawing Sheets

U.S. PATENT DOCUMENTS

| | | | |
|---|---|---|---|
| 6,011,780 A * | 1/2000 | Vaman et al. | 370/237 |
| 6,112,249 A | 8/2000 | Bader et al. | 709/239 |
| 6,236,642 B1 | 5/2001 | Shaffer et al. | 370/237 |
| 6,336,119 B1 | 1/2002 | Banavar et al. | 707/104.1 |
| 6,400,681 B1 | 6/2002 | Bertin et al. | 370/218 |
| 6,535,491 B2 | 3/2003 | Dutt et al. | 370/256 |

OTHER PUBLICATIONS

Mishra et al., "Consul: A Communication Substrate for Fault-Tolerant Distributed Programs", TR91-32, Department of Computer Science, The University of Arizona, pp. 1-33 (Nov. 1991).

Smirnov, M.I., "Object-Oriented Framework for a Scalable Multicast Call Modelling", Teleservices and Multimedia Communications Second International COST 237 Workshop, Proceedings, Springer-Verlag, vii+277, pp. 1-39 (1996).

Hofmann, M. "A Generic Concept for Large-Scale Multicast", Broadband Communications, Network, Services, Applications, Future Directions, International Zurich Seminar on Digital Communications, IZS '96, Proceedings, Springer-Verlang, xiv+358, pp. 95-106 (1996).

Zabele et al., "High Performance Infrastructure For Visually-Intensive CSCW Applications", Transcending Boundaries, CSCW '94, Proceedings of the Conference on Computer Supported Cooperative Work, ACM, xi+464, pp. 395-403 (Oct. 1994) (Abstract Only).

K.P. Birman, "The Process Group Approach to Reliable Distributed Computing", Communications of the ACM, vol. 36, No. 12 (Dec. 1993), pp. 37-53.

Oki et al., "The Information Bus—An Architecture for Extensible Distributed Systems", SIGOPS '93, ACM 0-89791-632-8/93/0012, (1993), pp. 58-68.

D. Powell, "Group Communication", Communications of the ACM, vol. 39, No. 4; (Apr. 1996), pp. 52-100.

M.I. Smirnov, "Efficient Multicast Routing in High Speed Networks", IN Comput Commun. (UK), vol. 19, No. 1, Elsevier, (Jan. 1996), pp. 59-75.

M. Grossglauser, "Optimal Deterministic Timeouts for Reliable Scalable Multicast", 0743-166X/96, 1996 IEEE, pp. 1425-1432.

* cited by examiner

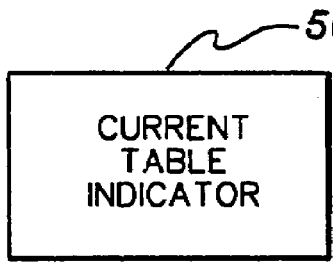
fig. 5A
fig. 5B
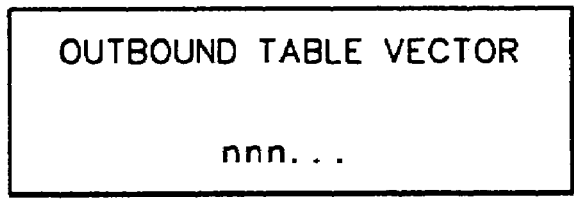
fig. 5C
fig. 5D
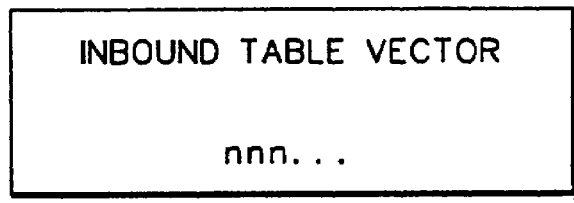
fig. 5E
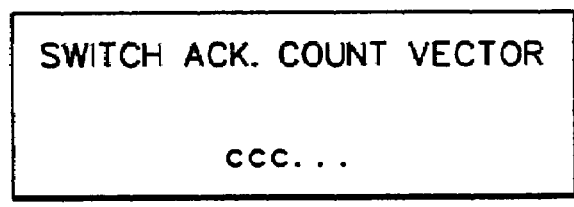
fig. 5F
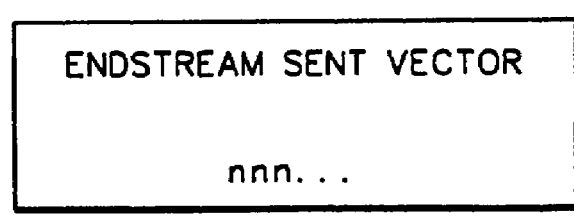
fig. 5G

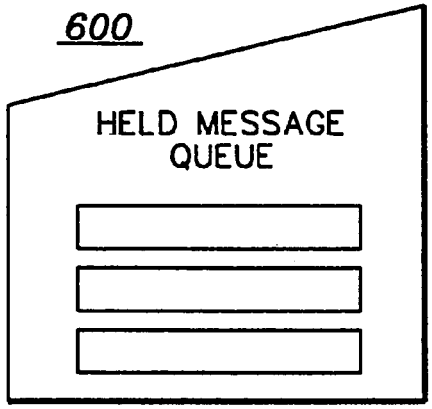
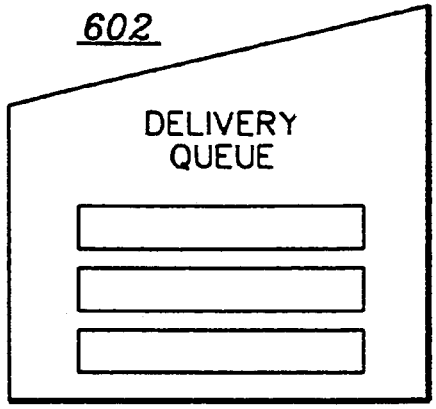
*fig. 6A*  *fig. 6B*
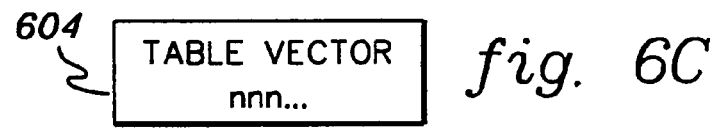
*fig. 6C*
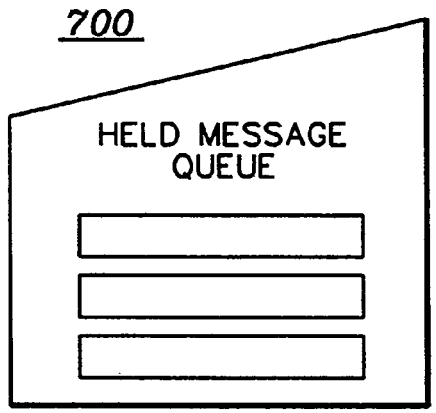
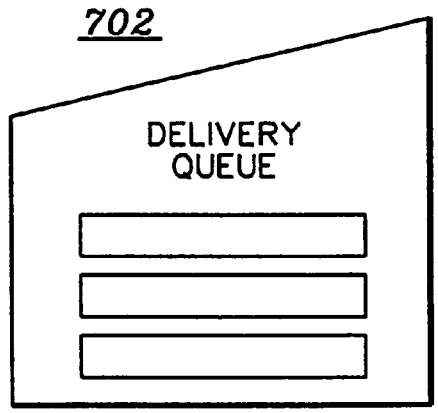
*fig. 7A*  *fig. 7B*
*fig. 7C*
*fig. 7D*

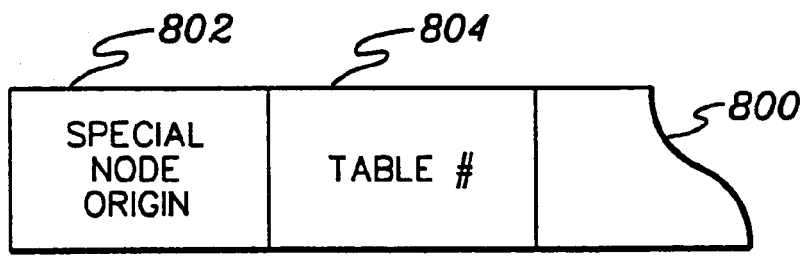
fig. 8A  SWITCH
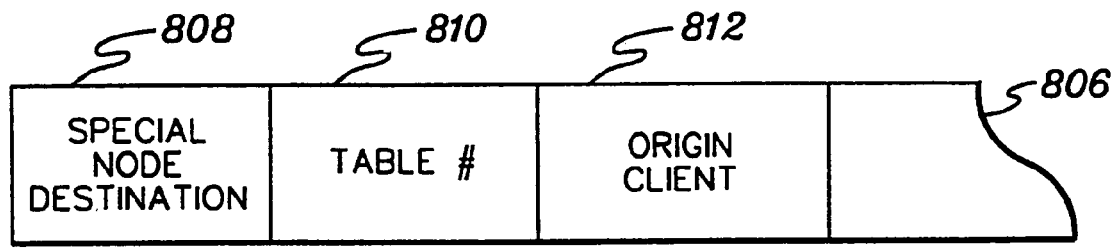
fig. 8B  CS-MESSAGE
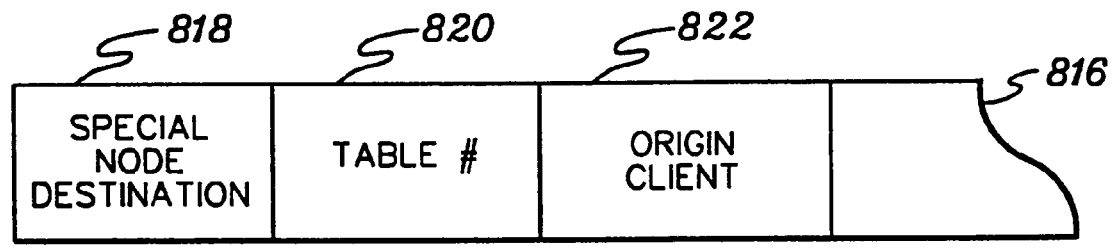
fig. 8C  ENDSTREAM-MESSAGE
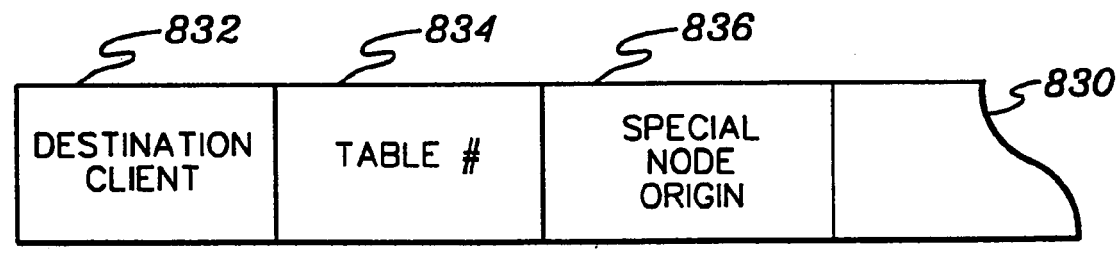
fig. 8D  SC-MESSAGE
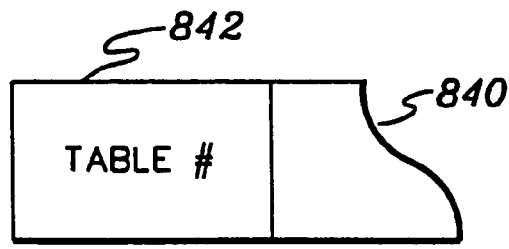
fig. 8E  CC-MESSAGE

CS-MESSAGE

NON-DISRUPTIVE RECONFIGURATION OF A PUBLISH/SUBSCRIBE SYSTEM

CROSS-REFERENCE TO RELATED APPLICATIONS

This application is a continuation of prior application Ser. No. 09/280,534, filed Mar. 30, 1999 now abandoned, which is hereby incorporated herein by reference in its entirety.

This application contains subject matter which is related to the subject matter of the following United States patent applications, which are assigned to the same assignee of this application. Each of the below-listed applications is hereby incorporated herein by reference in its entirety:

"Routing Messages Within A Network Using The Data Content Of The Message," by Chandra et al., U.S. Pat. No. 6,091,724, issued Jul. 18, 2000;

"Message Logging For Reliable Multicasting Across A Routing Network," by Banavar et al., Ser. No. 09/281,421, filed Mar. 30, 1999;

"Message Sequencing For Ordered Multicasting Of A Message Across A Routing Network," by Banavar et al., U.S. Pat. No. 6,760,340 B1, issued Jul. 6, 2004; and "Quiescent Reconfiguration Of A Routing Network", by Miller et al., U.S. Pat. No. 6,907,011 B1. issued Jun. 14, 2005.

TECHNICAL FIELD

This invention relates, in general, to reconfiguring a routing network and, in particular, to non-disruptively reconfiguring a publish/subscribe system without losing or reordering messages of the system during the reconfiguration.

BACKGROUND OF THE INVENTION

Many network environments enable messages to be forwarded from one site within the network to one or more other sites using a multicast protocol. Typical multicast protocols send messages from one site to one or more other sites based on information stored within a message header. That is, each message has two components: the message header, which includes the routing information, including destination addresses or a predefined group name that is associated with a fixed list of destinations, and a data content, which is the data of the message. The routing information is read from the message header and is used to send the data content of the message to the specified destinations.

One example of a system that conventionally includes such a network environment is a publish/subscribe system. In publish/subscribe systems, publishers post messages and subscribers independently specify categories of messages in which they are interested. The system takes the posted messages and includes in each message header the destination information of those subscribers indicating interest in the particular message. The system then uses the destination information in the message to forward the message through the network to the appropriate subscribers.

More particularly, a publish/subscribe system includes a network of message routers (or simply routers) connected via links in an arbitrary graph topology. A number of clients connect to the periphery of this router network and either publish or subscribe to messages. A message includes a number of attributes, which are name-value pairs.

The problem addressed by the present application is how to handle changes of topology in such a routing network. The need for changing a topology arises from a number of conditions, including: (1) the need for system maintainers to move routers on-line and off-line; (2) the growth of the network; and (3) changes in speed that alter the optimum spanning trees of the network; etc. An assumption is made that a configuration manager has made a decision to effect a particular topology change (i.e., a reconfiguration). The present invention is directed to providing a technique by which the nodes of the router network execute a reconfiguration decision, eventually resulting in a new state of the network in which messages are forwarded using a new spanning tree.

SUMMARY OF THE INVENTION

The shortcomings of the prior art are overcome and additional advantages are provided through the provision of a method of reconfiguring publish/subscribe systems. The method includes, for instance, initiating a reconfiguration of a publish/subscribe system; and reconfiguring the publish/subscribe system, wherein one or more messages of the publish/subscribe system are not lost during the reconfiguring.

In one embodiment, the reconfiguring is non-disruptive to the publish/subscribe system.

As one example, the reconfiguring includes changing from a first routing path between one node of the publish/subscribe system and another node of the system to a second routing path between the one node and the another node.

In one embodiment, the publish/subscribe system includes an ordering requirement for delivery of one or more messages from at least one node to at least one other node of the publish/subscribe system, and the reconfiguring preserves the ordering of delivery of the one or more messages.

In a further example, the method includes forwarding a message from at least one node of the publish/subscribe system to at least one other node of the system, after the reconfiguration is initiated. Additionally, another message is forwarded from at least one node of the system to at least one other node, wherein the another message is forwarded using a different routing path than the message.

In another aspect of the present invention, a system of reconfiguring publish/subscribe systems is provided. The system includes, for instance, means for initiating a reconfiguration of a publish/subscribe system; and means for reconfiguring the publish/subscribe system, wherein one or more messages of the publish/subscribe system are not lost during the reconfiguring.

In yet a further aspect of the present invention, an article of manufacture including at least one computer usable medium having computer readable program code means embodied therein for causing the reconfiguring of publish/subscribe systems is provided. The computer readable program code means in the article of manufacture includes, for instance, computer readable program code means for causing a computer to initiate a reconfiguration of a publish/subscribe system; and computer readable program code means for causing a computer to reconfigure the publish/subscribe system, wherein one or more messages of the publish/subscribe system are not lost during the reconfiguring.

The present invention advantageously provides for dynamic reconfiguration of a system. That is, the reconfiguration is accomplished without shutting down the network. In particular, it is not necessary to quiesce (i.e., block senders of messages from introducing new messages), while the reconfiguration is taking place. The execution of a reconfiguration is not directly visible to either publishers or subscribers. The publishers and subscribers continue to publish and receive messages as if no reconfiguration is taking place or has taken place.

The non-disruptive reconfiguration capabilities of the present invention have particular application in large, continuously available broker networks in which change and evolution are inevitable and service disruption is intolerable.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 5a-5g depict examples of data structures associated with a router of a network to undergo non-disruptive reconfiguration, in accordance with the principles of the present invention;

FIGS. 6a-6c depict examples of data structures associated with a client of a network to undergo non-disruptive reconfiguration, in accordance with the principles of the present invention;

FIGS. 7a-7d depict examples of data structures associated with a special node of a network to undergo non-disruptive reconfiguration, in accordance with the principles of the present invention;

FIGS. 8a-8e depict examples of headers of various messages used in accordance with the principles of the present invention;

BEST MODE FOR CARRYING OUT THE INVENTION

In accordance with the principles of the present invention, a reconfiguration capability is provided for distributed network environments, such as those included in publish/subscribe systems. As one example, a publish/subscribe system is non-disruptively reconfigured such that no messages are lost during the reconfiguration. Further, the reconfiguration is performed without quiescing the system (i.e., without having to suspend routing of messages). Additionally, properties of various messages within the system are preserved. For example, various messages have an ordering requirement associated therewith, and that ordering requirement is preserved during the reconfiguration. The present invention advantageously enables reconfiguration to be performed without affecting the qualities of service guaranteed to the clients.

Figure 1:
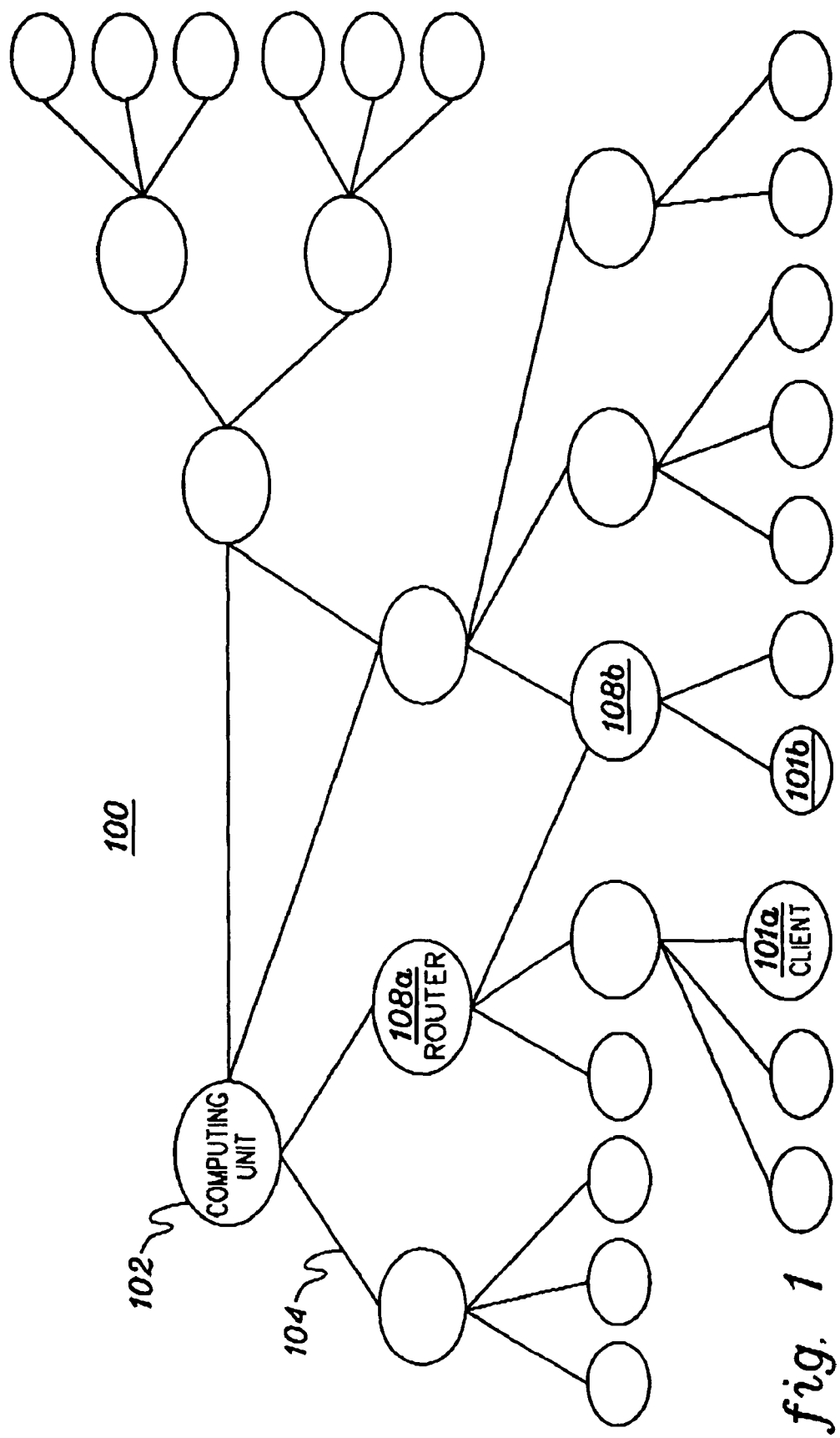
FIG. 1 depicts one example of a distributed network incorporating and using the non-disruptive reconfiguration capabilities of the present invention.

One example of a distributed network 100 incorporating and using the reconfiguration capabilities of the present invention is depicted in FIG. 1 and described in detail below. Network 100 includes, for instance, a plurality of computing units 102 coupled to one another via links 104.

Each link couples the computing units in the network, and each computing unit may have any number of links connected to it. Each link is bidirectional (i.e., a computing unit may send and receive messages on the link.) Each computing unit in the network is either a client computer (represented by the smaller ovals, such as those having addresses 101a, 101b), meaning that it has originated messages or requested to receive messages; or it is a router computer (represented by the larger ovals, such as 108a, 108b), meaning that it forwards messages received on one network link onto other links on the way to the client computer(s). The clients are collectively referred to herein as clients 101 and the routers are collectively referred to as routers 108. (For purposes of this discussion, if a single computing unit serves both as a router and as a client, these two separate functions will be considered as two computing units connected by a link.)

Each computing unit can be any type of computing unit that can be included in a network. For example, it can be an RS/6000 computing node or any other of various types of computing nodes, processors, computers or systems. The network can also include different types of computing units coupled to one another via the links. The links include, for instance, TCP connections over IP links, as only one example.

Distributed network 100 can be included in various systems that require the passing of messages or data. These systems include, for instance, publish/subscribe systems. As used herein, a publish/subscribe system includes any system that multicasts messages to one or more nodes of the system. Examples of publish/subscribe systems include group-based systems in which each message is initially assigned to one of a small number of groups representing a set of destinations; and content-based systems in which messages are routed from publishers to subscribers based on the content of the data within the message. With data-content routing, a message does not need to include destination information, such as destination addresses or a group destination name. Instead, data within the message is used to traverse a data structure to determine the link or links over which the message is to be forwarded in order to reach the consumers (subscribers or clients) interested in the message.

Content-based publish/subscribe systems improve the degree of decoupling between publishers and subscribers. In content-based publish/subscribe systems, subscriptions are specified in terms of predicates on the posted data, rather than in terms of subject identifiers supplied by the publisher. One example of a content-based publish/subscribe system is described in co-pending U.S. Pat. No. 6,216,132, issued, Apr. 10, 2001, entitled "Method And System For Matching Consumers To Events," Astley et al., which is hereby incorporated herein by reference in its entirety. Some of the examples described herein are with reference to a content-based subscription system. However, these are only examples. The present invention can be employed with other types of systems without departing from the spirit of the present invention.

As noted above, the present invention is applicable to group-based (i.e., subject-based) publish/subscribe systems. As a further example, the present invention is applicable to any systems in which the topology is relatively fixed. That is, at any time, each node in the network knows a single best path for a particular kind of message originating at node N1 and destined for node N2. The rules for computing this best path changes infrequently. Further, requirements for ordered delivery can be implemented by designating a small number of nodes to support strictly first in-first out (FIFO) message streams with the other nodes. In particular, it is assumed that message delivery is required to be FIFO between each client and each of a set of k nodes called special nodes s1, . . . sk, but that other message delivery is not required to be ordered.

Systems implementing reliable routing protocols and ordered delivery protocols are respectively described in "Message Logging For Reliable Multicasting Across A Routing Network," by Banavar et al., co-filed herewith, Ser. No. 09/281,421, filed Mar. 30, 1999, and "Message Sequencing For Ordered Multicasting Of A Message Across A Routing Network," by Banavar et al., co-filed herewith, Ser. No. 09/280,530, filed Mar. 30, 1999; where the "logger" nodes of the reliable routing protocol and the "sequencer" node of the ordered delivery protocol play the role of the special nodes herein.

In one embodiment of the invention, each router 108 of network 100 (FIG. 1) has associated therewith a spanning tree, which lays out the best path (according to some criterion, such as latency) from the router to one or more clients 101. In this embodiment, it is assumed that routers agree on a common criterion for measuring distance between nodes in the network. There may in fact be multiple spanning trees. For example, alternative spanning trees may specify either backup routes, or peak load routes. Herein, it is assumed that one spanning tree is in effect for the routing of any particular message.

Figure 2:
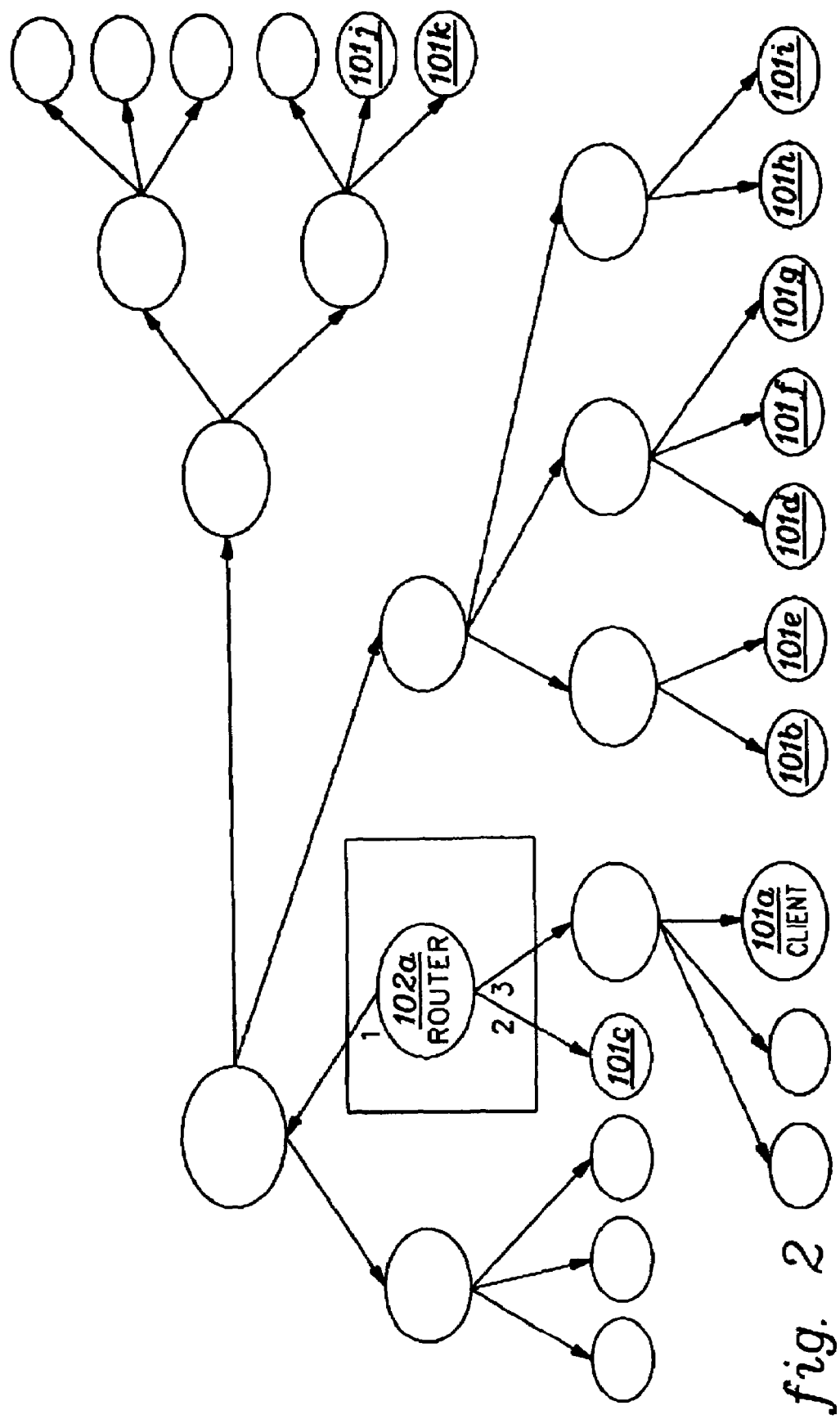
FIG. 2 depicts one example of a spanning tree used in accordance with the principles of the present invention.

One example of a spanning tree, which is associated with a router, is depicted in FIG. 2. As shown in FIG. 2, there is a path from router 102a to every other node in the spanning tree. A message to be routed from router 102a to one or more of the other nodes is routed via one or more of the links associated with router 102a, i.e., links 1-3. For example, if a message is to be routed from node 102a to node 101c, then link 2 is used. As a further example, if a message is to be forwarded toward client 101a, then link 3 is used.

One embodiment for building a spanning tree from a network topology, that is an arbitrary graph, is described in detail in *Introduction to Algorithms*, by Cormen, Leirson, Rivert, Chapter 24, pp 498-513, Published by MIT Press (1990), which is hereby incorporated herein by reference in its entirety.

Figure 3:
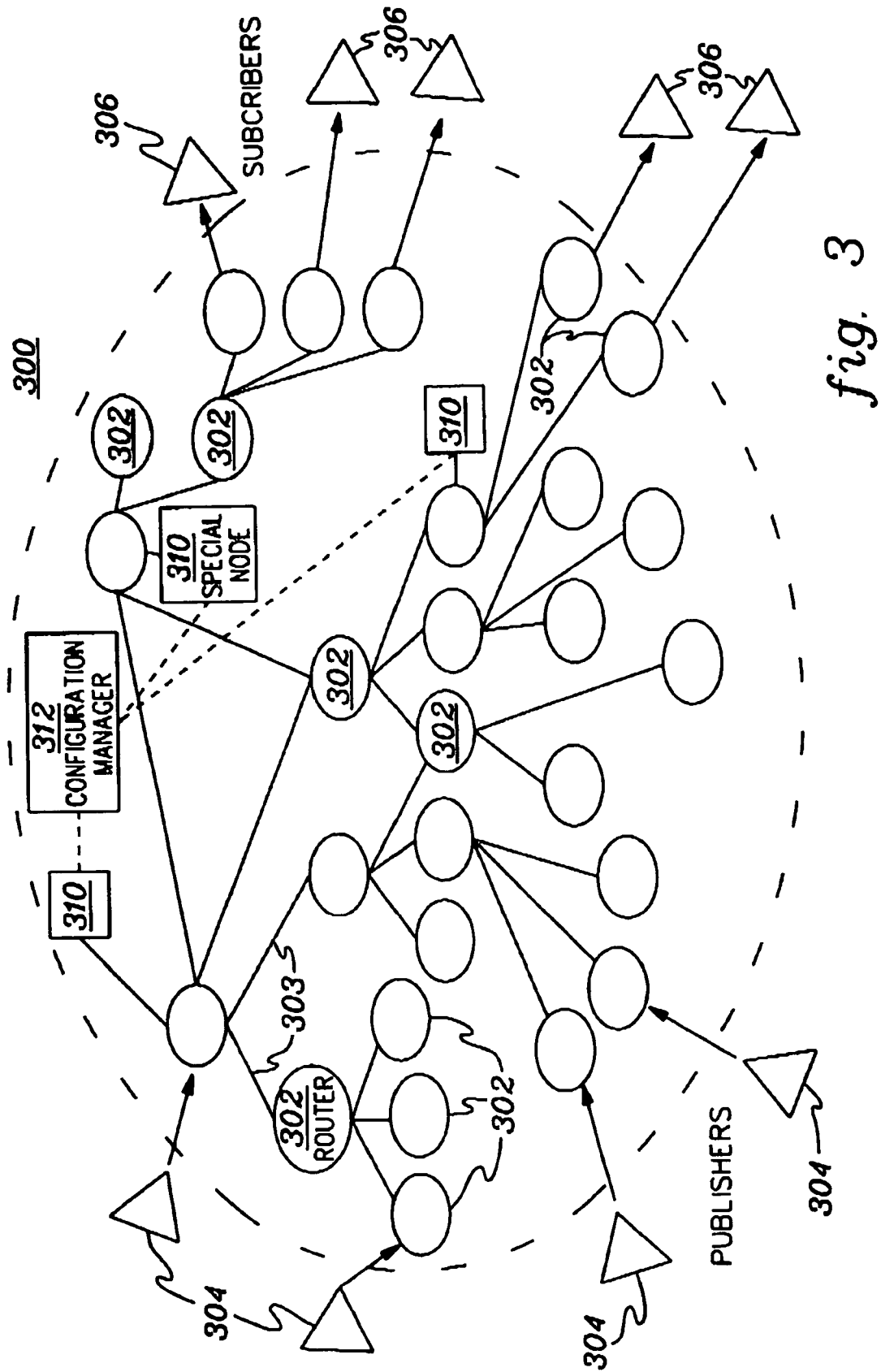
FIG. 3 depicts one embodiment of a distributed router network, which is to undergo non-disruptive reconfiguration in accordance with the present invention.

By way of example, FIG. 3 depicts one embodiment of a publish/subscribe system, generally denoted 300, to employ non-disruptive reconfiguration in accordance with the principles of the present invention. System 300 includes a network of routers 302 connected via links 303 in an arbitrary graph topology. A number of clients connected to the periphery of this router network either publish messages or subscribe to messages. Those clients publishing messages comprise publishers 304, while those clients subscribing to messages comprise subscribers 306. The router network is responsible for routing messages from a publisher 304 to interested subscribers 306 based, for example, on matching messages to subscription predicates.

This protocol, known as content-based routing, is described in detail in the initially-incorporated co-pending patent application entitled "Routing Messages Within A Network Using The Data Content Of The Message." As noted, from each router node at which a publisher is present, the system computes and stores a spanning tree to reach every other node in the network. All published messages from the publisher follow the paths in that spanning tree, with each router node performing enough matching to determine which of its child routers should receive the message.

Within a publish/subscribe system, the present invention can be employed, in one example, with a network achieving reliability of routed messages by saving messages to persistent storage within the network (and then retrieving and redelivering the message whenever there is a failure in the network). Such a reliable routing network is described in the above-incorporated, co-filed patent application entitled "Message Logging For Reliable Multicasting Across A Routing Network." In accordance with that invention, publishers and subscribers that need reliability of messages may specify a quality of service parameter, e.g., "uniform delivery". Uniform delivery is provided for ensuring delivery of a message to all active subscribers notwithstanding failure in the network, e.g., the routers, or the links. One or more special nodes 310 in router network 300 are designated logging node(s) or logger(s) and support the ability to log messages to stable storage. When there is at least one subscriber needing logging, the routing algorithm ensures that messages are routed to the logger.

Alternatively, or in further combination, the present invention can be employed in another example with a network achieving ordering of routed messages by sequencing messages within the router network itself through assignment of a sequence number at a designated sequencing node of the network. Publishers and subscribers that need ordering of messages may specify a quality of service parameter called "totally ordered". Total ordering is provided by ensuring ordered delivery of a message to all active subscribers. Such message sequencing within the router network is described in the above-incorporated, co-filed application entitled "Message Sequencing For Ordered Multicasting Of A Message Across A Routing Network." When employing sequencing, a special node 310 in router network 300 is designated a sequencing node or sequencer. Node 310 supports the ability to sequence messages received into the routing network. When there is at least one subscriber needing total ordering, the routing algorithm guarantees that messages are routed to the sequencer.

In one example, each special node is coupled to a configuration manager 312. (In another embodiment, one or more, but not necessarily all, special nodes are connected to the configuration manager.) The configuration manager is, for instance, responsible for making the decision to effect a particular topology change, i.e., a reconfiguration. A configuration manager is, for instance, a "network system service" that is responsible for maintaining information about the structure, function and status of a network system. This includes information such as the network topology, nodes with certain properties (such as the special nodes), quality of service offered to the nodes in the network, etc. A system's configuration may be statically fixed or dynamically changing. A configuration manager may be centralized or distributed. Network system management products such as IBM's Tivoli TME-10 contain configuration management components.

To summarize, in one example, non-disruptive reconfiguration pursuant to the present invention can be employed in a router network of a publish/subscribe system which utilizes at least one special node to facilitate either, or both, logging of messages or sequencing of messages with the network itself.

In the above example, client nodes 304, 306, router nodes 302 and special nodes 310 are shown as separate physical computers connected via bidirectional links. However, in another example, all three types of nodes (or a subset thereof) can be located within a single physical computer and connected by one or more virtual links.

Figure 4:
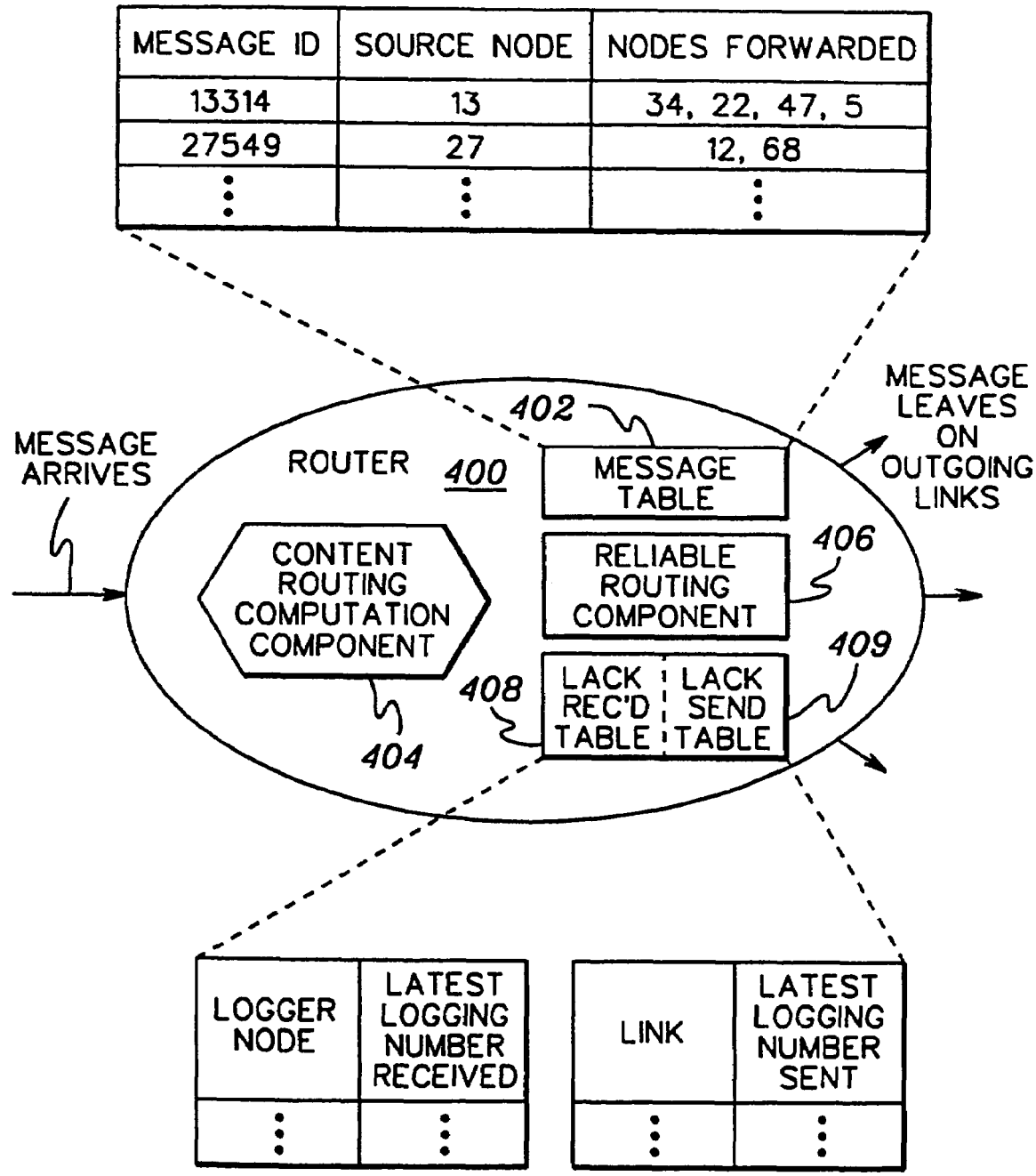
FIG. 4 depicts one embodiment of a router for use, in accordance with the principles of the present invention, in a router network such as the one depicted in FIG. 3.

Further details of one embodiment of a content-based router node, used in accordance with the principles of the present invention, are described with reference to FIG. 4. When a message arrives at router 400, it is stored into a message table 402 using a unique message identifier. Information stored includes a source node identification, as well as the neighboring nodes to which the message is to be forwarded. These neighboring nodes are calculated by a content routing computation component 404 after the message has been received. Computation component 404 takes the message and based upon stored subscriptions returns a set of destinations or links upon which the message should be forwarded. Again, in one embodiment, this computation is content dependent and can be accomplished as described in the above-incorporated co-pending application. However, this component can also be implemented in other ways, e.g., subject-based routing.

In one embodiment, to facilitate reliable routing of messages, router 400 also includes a reliable routing component 406, a logging acknowledgment (LACK) received table 408 and a LACK send table 409, which are described in the above-incorporated, co-filed application entitled "Message Logging For Reliable Multicasting Across A Routing Network."

If ordered routing of messages is employed, then router 400 would also include recovery data, including a latest sequence number received and linked node tables (not shown) such as described in the above-incorporated, co-filed application entitled "Message Sequencing For Ordered Multicasting Of A Message Across A Routing Network." Again, the non-disruptive reconfiguration approach of this invention can be employed in a routing network of a publish/subscribe system employing data content messaging, reliable routing of messages, or sequencing of messages, either individually or in combination as will be apparent from the following description.

Various nodes within the network have data structures associated therewith that are used during the reconfiguration of the present invention. These data structures are described below with reference to FIGS. 5a-7d.

For example, with reference to FIGS. 5a-5b, each router node has two routing tables associated therewith, a Table-0 (500a of FIG. 5a) and a Table-1 (500b of FIG. 5b). (Although in the embodiment described herein, each router has data structures associated therewith, in another embodiment, one or more of the routers may not have such data structures. The same is true for the other nodes described below.) In one example, the routing tables are located within storage of the corresponding router node. Table 500a includes, for instance, one or more destination nodes 502a, and at least one path 504a for each destination node. For instance, Table 500a includes an entry for each client computer in the network. Each entry of the routing table associates a client address with the identifier of the network link constituting the next segment on the path in the spanning tree from the router to the client. For a router with d network links, each such link identifier is an integer between 1 and d. For instance, the client having address 101a has a corresponding link identifier of 3 (see FIG. 2) in the router table for router 102a.

Similarly, Table-1 includes one or more destination nodes 502b and at least one path 504b for each destination node. Initially, one of the tables, e.g., Table-0, is configured by its corresponding router with information provided by the configuration manager. That is, the routing table is constructed via information from the network topology (e.g., the client addresses) and hence from the corresponding spanning tree (e.g., the link identifiers), in a known manner. The other table, e.g., Table-1, is initially empty.

At a topology change, i.e., a reconfiguration, configuration manager 312 distributes information allowing each router 108 to configure a new topology in Table-1. For a period of time, some messages are routed using Table-0 (the old table), while others use Table-1 (the new table). Eventually, the configuration stabilizes to a point where all routers are using the new table for all messages. After this time, it is possible for the configuration manager to initiate a new reconfiguration. When the next reconfiguration occurs, Table-0 is the new table and Table-1 is the old table. Thus, on odd-numbered reconfigurations, Table-1 is the new table, and on even-numbered reconfigurations, Table-0 is the new table.

The current table is indicated by a current table indicator 506 (FIG. 5c) stored within, for instance, the routing node. In one example, current table indicator 506 is a binary indicator. Initially, it is set to 0, and is flip-flopped each time a reconfiguration takes place.

In addition to the above routing tables, each router has a number of other data structures associated therewith. For example, each router node keeps an outbound table vector 508 (FIG. 5d) of k bits, where k is equal to the number of special nodes. Bit i in this vector is 1, if Table-1 is to be used on messages sent from special node si, and it is 0, if Table-0 is to be used. Each router node also has an inbound table vector 510 (FIG. 5e) of k bits. Bit i in this vector is 1, if Table-1 is to be used on messages sent through this router towards special node si, and it is 0, if Table-0 is to be used.

Additionally, each router node has a switch acknowledgment count vector 512 (FIG. 5f) of k counts. A nonzero count c in position i implies that a switch message (described below) has been received on a spanning tree originating at special node si and the router has forwarded the switch message to the nodes below it, but has not yet received a switch-ack message from c of these nodes. Finally, each router node with attached clients keeps an Endstream-sent vector 514 (FIG. 5g) of k bits. The i-th bit is on, if an Endstream-message (described below) has been sent to the i-th special node on behalf of one of the clients attached to this router. Initially, all bits are set.

In addition to the data structures for router nodes, each client node also has one or more data structures associated therewith. For example, each client node has a held message queue 600 (FIG. 6a) for each special node of the system. Held message queue 600 holds SC-messages (described below) received at the client from a special node along a path determined by a new topology that are being held until all earlier SC-messages sent from that special node along the path determined by the old topology have been received.

Each client node also includes a delivery queue 602 (FIG. 6b) of SC-messages ready to be received by clients. Each client node keeps a table vector 604 (FIG. 6c), which indicates for each special node which table represents the new path and which represents the old path. Initially, this is set to 0 for each special node.

Each special node also has one or more data structures associated therewith. For example, each special node has a held message queue 700 (FIG. 7a) for each client node, which has delivered a CS-message (described below) to that special node along a new topology prior to the special node receiving all earlier CS-messages from that client along the path determined by the old topology. It additionally keeps a delivery queue 702 (FIG. 7b) of CS-messages ready to be delivered to the special node. Each special node keeps an indicator 704 (FIG. 7c) to determine whether the latest table is Table-0 or Table-1. Further, each special node keeps a list 706 (FIG. 7d) of clients that have completed sending FIFO streams from the previous table; initially that is set to the value ALL.

The above-described data structures are used, in accordance with the principles of the present invention, during the routing of messages from one or more nodes of a publish/subscribe system to one or more other nodes. Examples of messages employed with the present invention include reconfiguration messages sent from the configuration manager to one or more special nodes of the system, when a reconfiguration is to take place; a CS-message delivered FIFO between a client and a special node; an SC-message delivered FIFO between a special node and a client; a CC-message delivered multicast, unordered between two clients; an Endstream-message sent by a client to a special node (and delivered FIFO), when it is the end of a sequence of messages sent to the special node on the old path; and a switch message sent to indicate the switching from an old path to a new path.

Each of the messages described above, except for the reconfiguration request, includes a message header that provides information used during routing. Examples of some of the data fields associated with the various message headers are described below with reference to FIGS. 8a-8e.

Referring to FIG. 8a, as one example, a switch message header 800 or a switch-ack (switch acknowledgment) message header 800 includes, for instance, a special node origin field 802 indicating the index (i.e., the address) of the special node from which the switch message originated; and a table number field 804 indicating which routing table (Table-0 or Table-1) is the current table.

A CS-message header 806 (FIG. 8b) includes, for example, a special node destination field 808 indicating the index of the special node to receive the message; a table number 810 indicating the current routing table; and an origin client field 812 specifying an address of the client originating the CS-message.

Referring to FIG. 8c, Endstream-message header 816 includes, for instance, a special node destination field 818 indicating the index of the special node to receive the message; a table number field 820 specifying the current routing table; and an origin client field 822 indicating an index of the client originating the message.

An SC-message header 830 (FIG. 8d) includes, for example, a destination client field 832 specifying the address of the client to receive the message; a table number field 834 indicating the current routing table; and a special node origin field 836 specifying an index of the special node originating the message.

Lastly, referring to FIG. 8e, a CC-message header 840 includes a table number field 842 specifying the current routing table.

Details of how the fields of the message headers are used during processing of the messages are described in detail below with reference to FIGS. 9-12.

Figure 9:
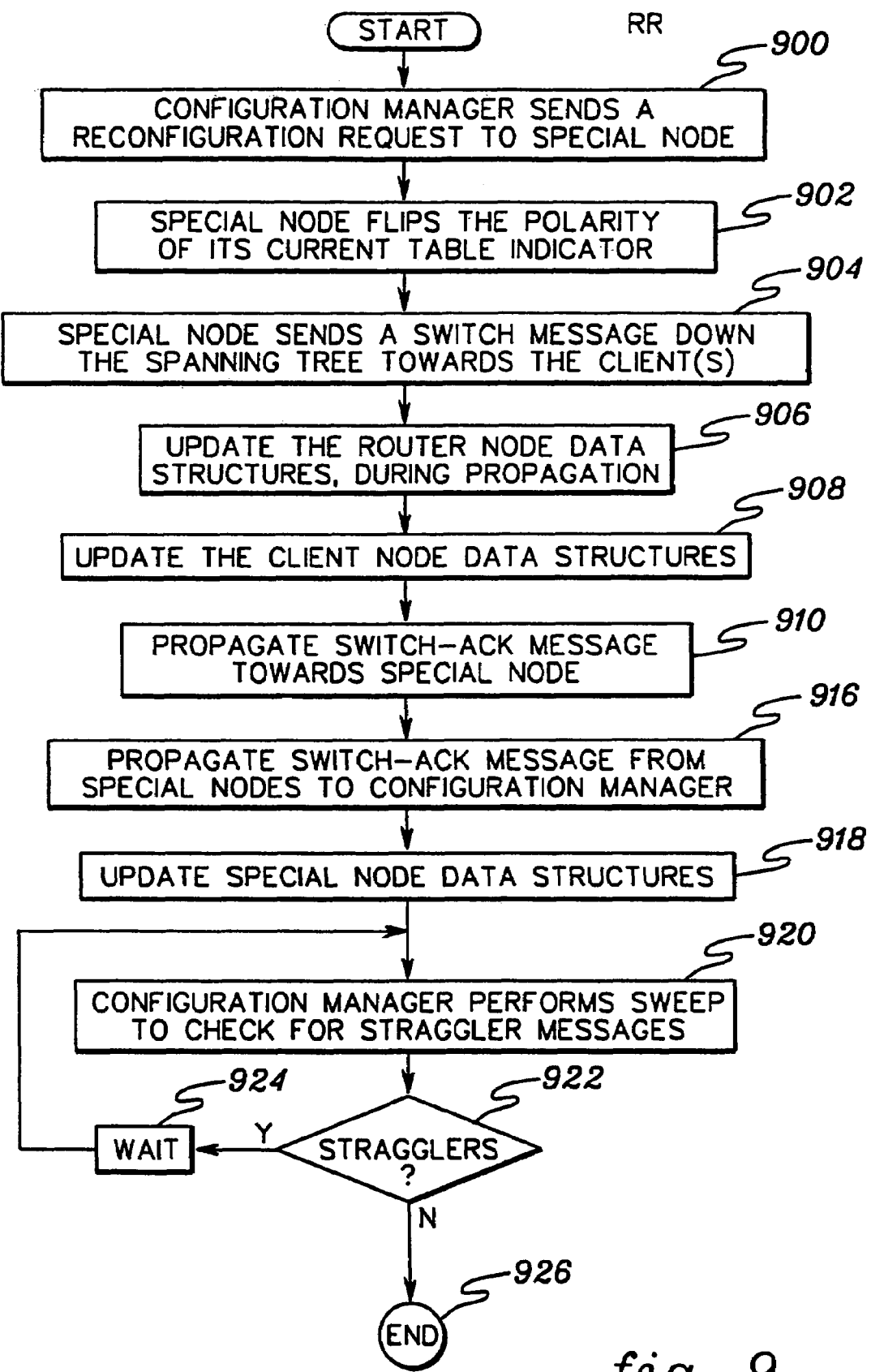
FIG. 9 depicts one embodiment of the logic associated with processing a reconfiguration request, in accordance with the principles of the present invention.

Referring to FIG. 9, one embodiment of the logic associated with processing a reconfiguration request is described in detail. When a decision is made to reconfigure the system (e.g., change the network or routing topology), the configuration manager sends a reconfiguration request message to one or more (preferably each) of the special nodes of the system. The processing described below is with reference to one special node. However, similar processing is performed by each special node that receives the request.

Initially, the configuration manager sends a reconfiguration request to a special node, STEP 900. This is accomplished via, for instance, a multicast operation or a point to point operation. When the special node receives the message, it flips the polarity of its current table indicator 704, STEP 902. For example, if the indicator was set to 0, then it is changed to 1 indicating that routing Table-1 is the new current table.

Thereafter, the special node that received the reconfiguration request passes a switch message down the spanning tree towards clients 101, STEP 904. The switch message includes the new table indicator in table number field 804, and the index of the special node sending the switch message in special node origin field 802. The switch message also includes the contents of the designated table. The switch message is propagated through routers 108, and during propagation, the router node data structures are updated, STEP 906. For instance, at each router 108 that receives the message, the new table indicator is saved as indicator 506 (FIG. 5c). Further, outbound table vector 508 (FIG. 5d) of the router is updated by having the bit in the position corresponding to the special node index i (as specified in field 802) set to the value of table indicator 506. For example, if i is equal to 2, then the bit in position 2 of the vector is updated.

Propagation of the switch message through the routers includes, for each outbound link (e.g., all links except the one back towards the special node), propagating a copy of the switch message downward towards the clients, and updating switch acknowledgement count vector 512 (FIG. 5f). In particular, the position within the vector corresponding to the special node index i is set equal to the number of copies propagated.

Further, if the router node has clients, then an entry in bit position i of endstream-sent vector 514 (FIG. 5g) is cleared. When the switch message reaches a client, then the client node data structures are updated, STEP 908. For example, bit position i of table vector 604 (FIG. 6c) is set equal to the new table indicator, the messages on held queue 600 are transferred to delivery queue 602, and the held queue is emptied.

A switch-ack message is then propagated from the client back towards the special node, STEP 910. For example, when a router receives a switch-ack message for a special node i, it decrements the counter for position i in switch-ack count vector 512 (FIG. 5f). When the counter reaches 0, indicating that all of the intended clients have received the switch message from the special node and they have acknowledged the same, a switch-ack message is propagated up to the next hop on the path to the special node.

When a switch-ack message reaches a special node, it is propagated to the configuration manager, STEP 916. Additionally, the special node transfers any messages in held message queue 700 to the corresponding delivery queue 702, and resets list 706 to all, indicating that only the new path will be used for any further messages, until the next reconfiguration, STEP 918. When the configuration manager receives a switch-ack message from all of the special nodes, it then performs a sweep to check for straggler messages that are still using the old routing tables, STEP 920. There are a number of existing sweep techniques in the published literature which can be used for such purpose; one such technique is the Jefferson GVT technique, described in DR Jefferson "Virtual Time" ACM Transactions on Programming Languages and Systems, Vol 7 #3, July 1985, pp 404-425, which is hereby incorporated herein by reference in its entirety.

If stragglers exist, INQUIRY 922, then the configuration manager waits a predefined amount of time, STEP 924, and then performs a sweep, again, STEP 920. When it is confirmed that no stragglers exist, INQUIRY 922, processing of the reconfiguration request is complete, STEP 926.

Figure 11:
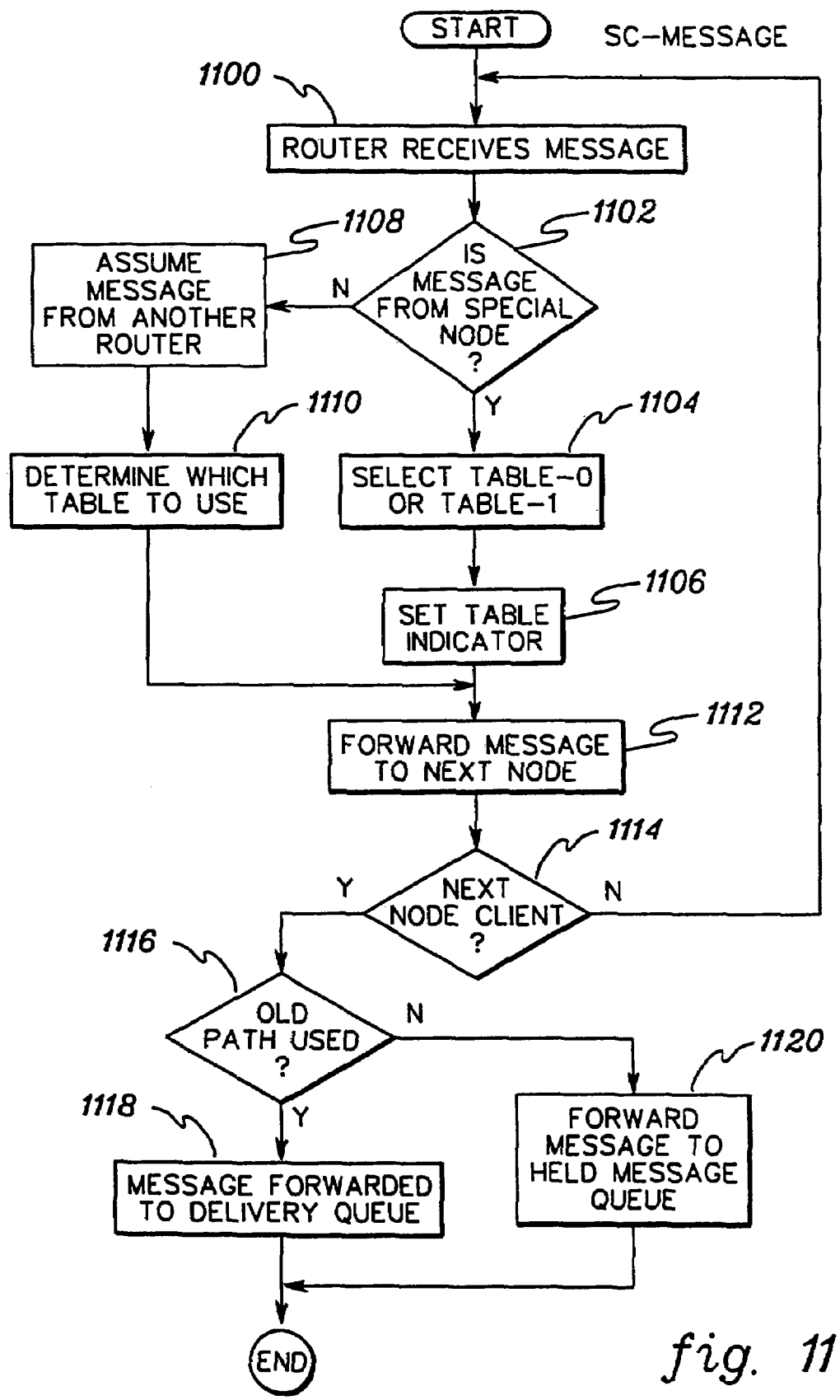
FIG. 11 depicts one embodiment of the logic associated with processing an SC-message, in accordance with the principles of the present invention.
Figure 12:
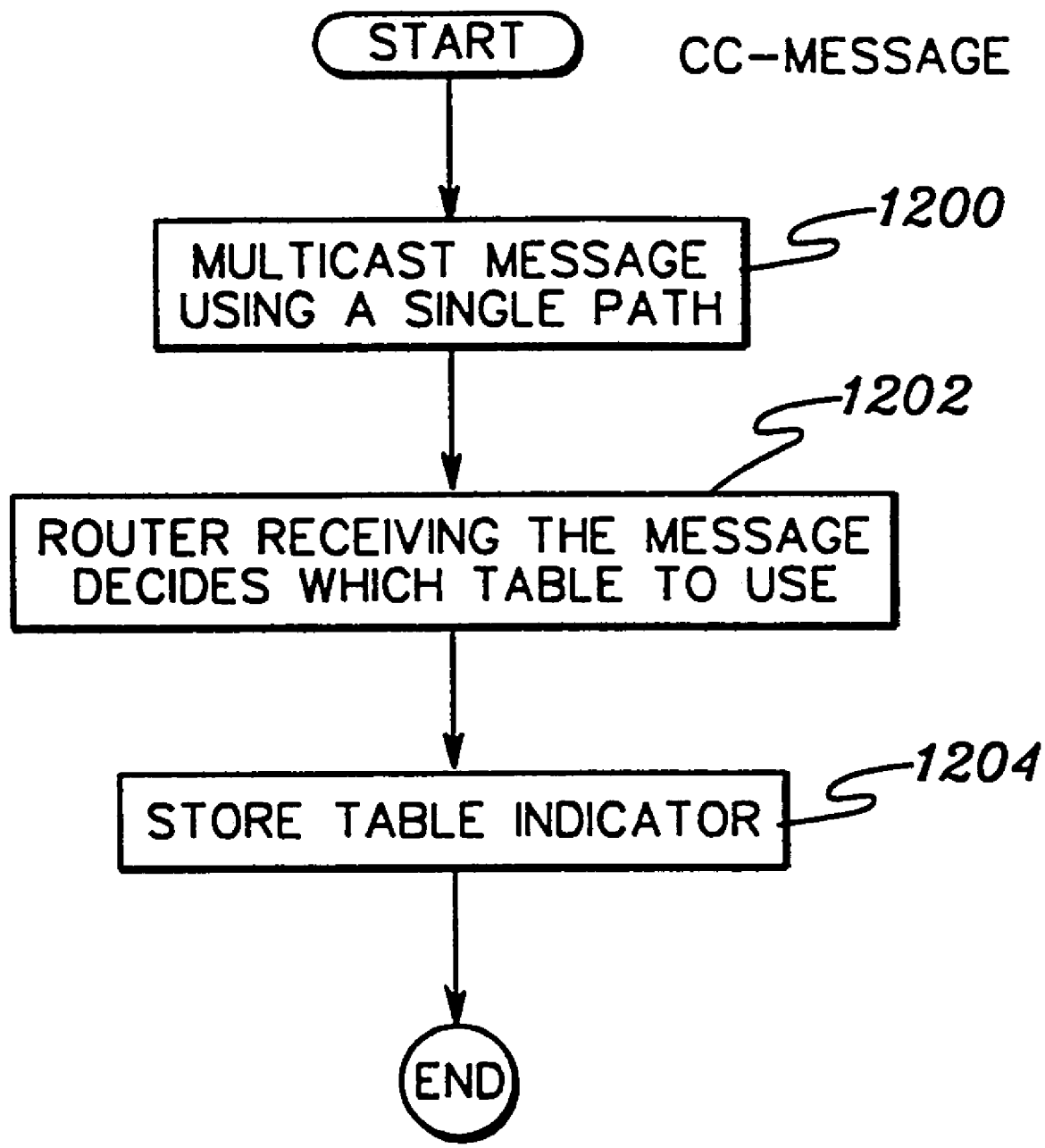
FIG. 12 depicts one embodiment of the logic associated with processing a CC-message, in accordance with the principles of the present invention.

After the configuration manager initiates a reconfiguration request and before the nodes update their data structures, the system is in a mode where there are two tables in effect, i.e., the old table and the new table. FIGS. 10-12 describe how processing is to be performed for specific messages, when the system is in such a mode.

Figure 10A:
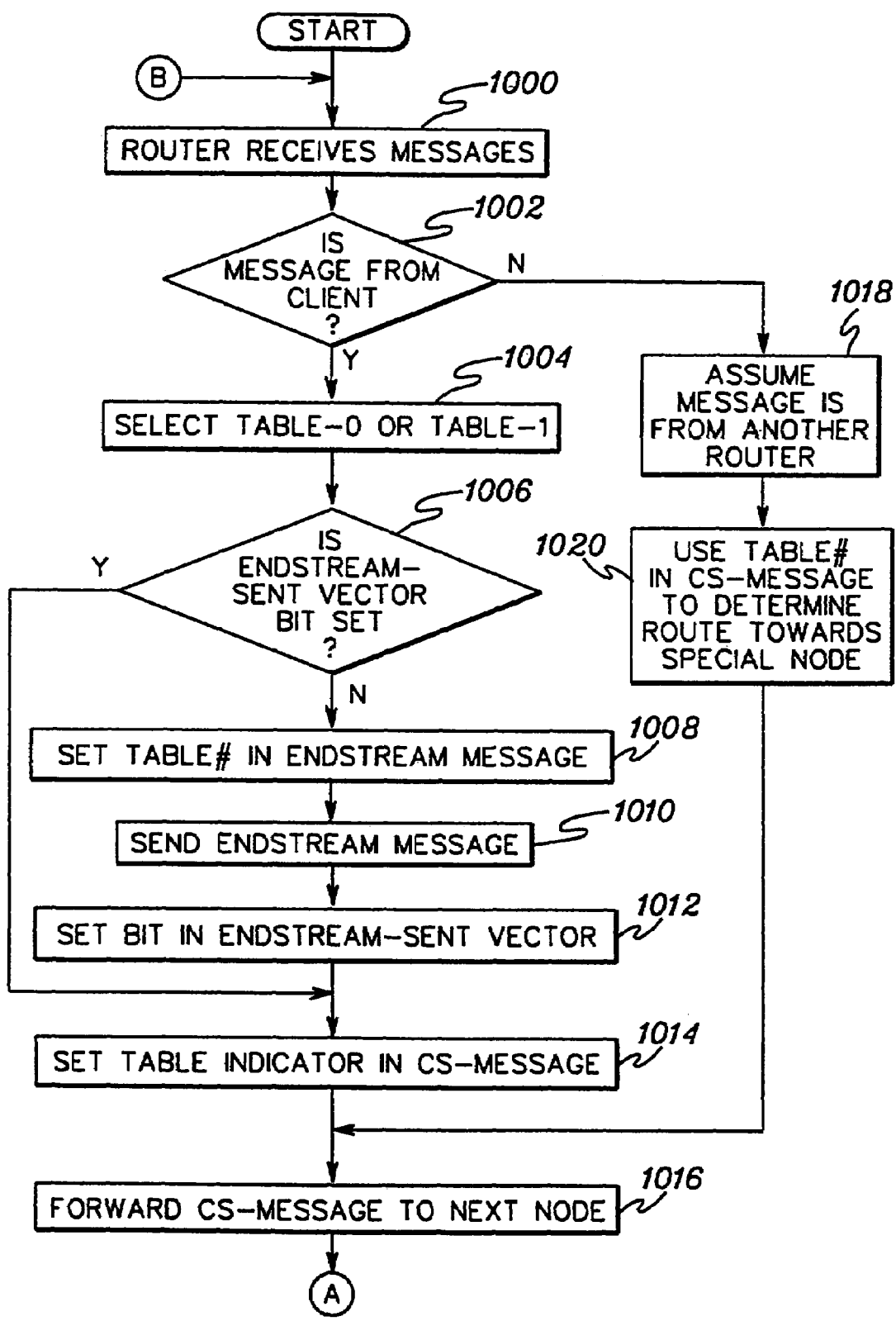
FIGS. 10a-10b depict one embodiment of the logic associated with processing a CS-message, in accordance with the principles of the present invention.
Figure 10B:
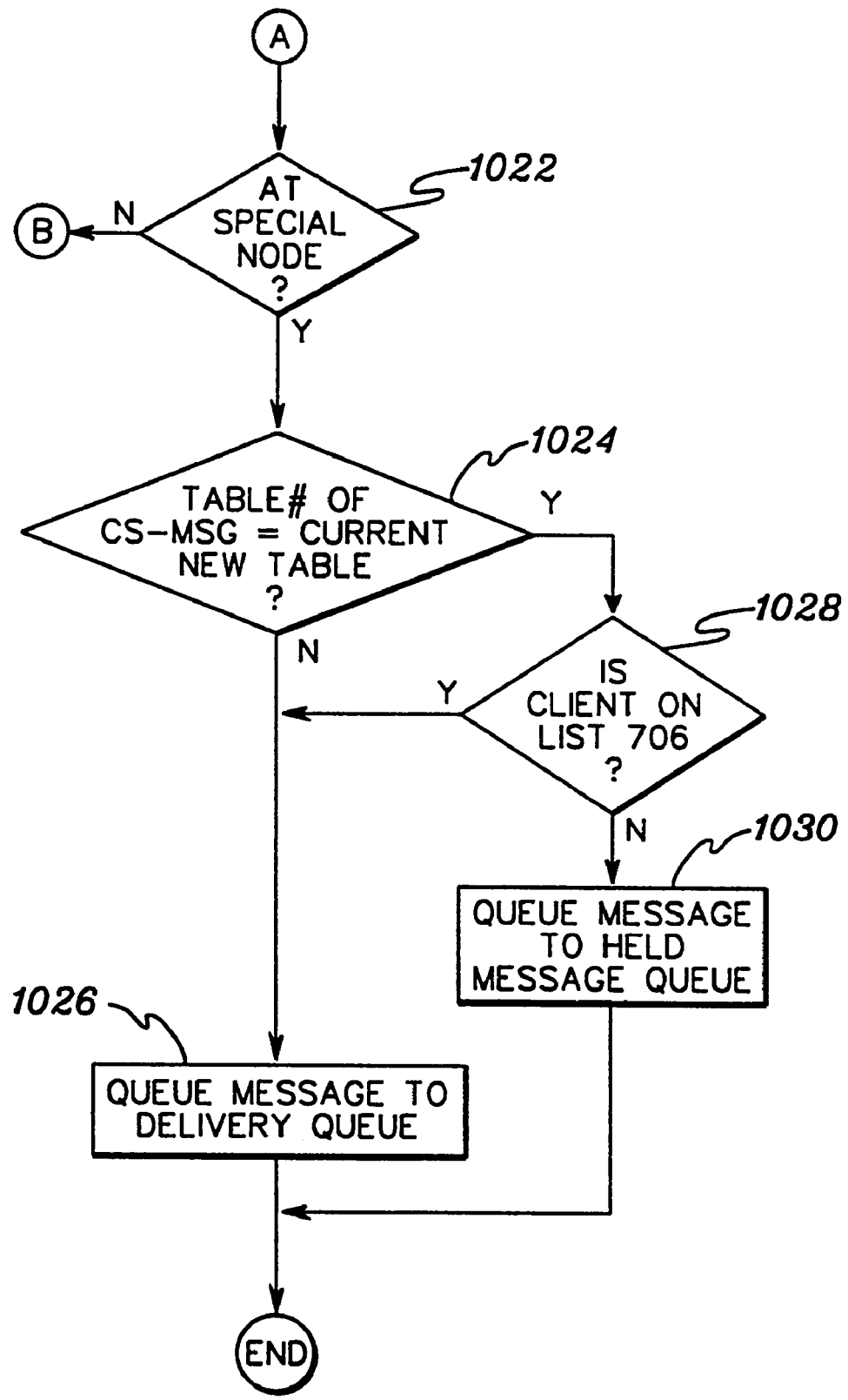

As one example, FIGS. 10a-10b describe one embodiment of the processing associated with a CS-message, in accordance with the principles of the present invention. The logic is described with reference to one router receiving the message. However, each router that receives the message performs similarly.

Referring to FIG. 10a, initially, a router of the system receives a CS-message that is to be routed towards a special node, STEP 1000. When the router receives the message, a check is made to determine if the arriving CS-message is from a client, INQUIRY 1002. If it is from a client, then inbound table vector 510 (FIG. 5e) is examined in the bit position corresponding to the special node designated by special node destination field 808 supplied in the CS-message. As a result, either Table-0 or Table-1 is selected for routing the message towards the special node, STEP 1004.

Thereafter, a determination is made as to whether the corresponding bit in endstream-sent vector 514 (FIG. 5g) is set, INQUIRY 1006. If it is not set, then table indicator 820 in an Endstream message is set to the old table, STEP 1008, and the Endstream message is sent to the special node using the route defined by the old table (the opposite of the table selected by vector 510), STEP 1010. The manner in which the Endstream message is sent is similar to the manner in which the CS-message is sent. Additionally, the corresponding bit in Endstream-sent vector 514 is then turned on, STEP 1012. Thereafter, table indicator 810 in the CS-message is set to record which table was used, STEP 1014, and the CS-message is then forwarded to the next node, which is either another router 108 or the destination special node, STEP 1016.

Returning to INQUIRY 1006, if the endstream-sent vector bit is set, then processing proceeds to STEP 1014, in which the table indicator is set. Subsequently, the CS-message is forwarded to the next node, STEP 1016.

Returning to INQUIRY 1002, if the arriving message is not from the client, but from another router, STEP 1018, then table indicator 810 in the message is used to determine the route to take towards the special node, STEP 1020. Thereafter, the CS-message is forwarded to the next node, STEP 1016, which is either another router or the destination special node.

Subsequently, a determination is made as to whether the message is at the special node, INQUIRY 1022 (FIG. 10b). If not, then processing continues with STEP 1000. That is, the message is to be processed by the next router.

However, if the message has arrived at the special node, then table indicator 810 is compared against the latest table indicator 704, INQUIRY 1024. If the CS-message is for the old table, it is immediately queued to delivery queue 702, STEP 1026. Otherwise, a determination is made as to whether the origin client has finished its FIFO stream for the old table, as determined by list 706, INQUIRY 1028. If the client is on list 706, the message is queued to delivery queue 702, STEP 1026. Otherwise, it is queued to held message queue 700, STEP 1030. Processing of the CS-message is then complete.

Messages are transferred from held message queue 700 for the specified client to delivery queue 702, when an Endstream-message arrives at the special node or when the switch-ack is received. At that point, the held message queue is emptied, and the client is added to list 706. The messages on delivery queue 702 are delivered to the special node in the order that they are received on the queue.

One embodiment of processing SC-messages, in accordance with the principles of the present invention, is described with reference to FIG. 11. Again, the logic is described with reference to one router receiving the message. However, each router that receives the message performs similar logic.

Referring to FIG. 11, initially, a router receives a message, STEP 1100. When the router receives the message, a determination is made as to whether the arriving SC-message is from a special node, INQUIRY 1102. If so, then outbound table vector 508 is examined in the bit position corresponding to the special node designated in special node origin field 836. As a result, either Table-0 or Table-1 is selected for routing the message towards the client, STEP 1104. Thereafter, table indicator 834 is set to indicate the table to be used in subsequent hops toward the client, STEP 1106.

Returning to INQUIRY 1102, if the arriving SC-message is not from a special node, then it is assumed to be from another router, STEP 1108. Thus, table indicator field 834 in the message is used to determine which table is to be used to route the message toward the client, STEP 1110.

Subsequent to determining which table to use, STEP 1110, or subsequent to setting the table indicator, STEP 1106, the message is forwarded to the next node, which is either another router 108 or the destination client 101, STEP 1112. If the next node is not the client, INQUIRY 1114, then processing continues with STEP 1100. Otherwise, table indicator 834 in the message is compared with table vector 604 in the bit position corresponding to the special node origin specified in message field 836, INQUIRY 1116. If the message was sent over the old path (tables match), it is forwarded directly to delivery queue 602, STEP 1118. If it was sent over the new path (tables do not match), it is forwarded to held message queue 600, STEP 1120. Processing of the SC-message is then complete.

Messages on held message queue 600 are transferred to delivery queue 602, when a switch message is received at the client, as described above.

FIG. 12 depicts one embodiment of the processing associated with CC-messages, in accordance with the principles of the present invention. The processing is once again described with reference to one router, but each router receiving the message performs similarly.

A CC-message is multicast using a single path, either the old path or the new path, STEP 1200. When the message reaches the nearest router to the client delivering the CC message, that router uses table indicator 506 to decide which table to use, STEP 1202. That table indicator is then stored in table indicator field 842 of the CC-message, STEP 1204. The message is forwarded or multicast to the next hop or hops using that table. This continues until all destination clients have received the message.

Optimizations of the above techniques are possible. For instance, if the same message is multicast to a client or clients as a CC-message, and sent to a special node as a CS-message, it is possible for these two logical messages to be bundled into a single physical message. Other similar optimizations in which the information content of the defined messages are bundled together may be performed.

Described in detail above is the processing that takes place when a reconfiguration request is initiated. In accordance with the principles of the present invention, each of the different types of messages determines which path to use during the routing of the message. Some messages may be routed using the old path and some may be routed using the new path, until the system is stabilized. This allows reconfiguration to take place that is non-disruptive and does not require quiescing. Further, messages are not lost during the reconfiguration, and ordering of the delivery of the messages is preserved (reordering is not necessary, either).

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of reconfiguring publish/subscribe systems, said method comprising:
    initiating a reconfiguration of a publish/subscribe system; and
    reconfiguring said publish/subscribe system, wherein no messages of said publish/subscribe system are lost during said reconfiguring;
    wherein said reconfiguring is non-disruptive to said publish/subscribe system, wherein said publish/subscribe system comprises an ordering requirement for delivery of one or more messages from at least one node to at least one other node of said publish/subscribe system, and wherein said reconfiguring preserves said ordering of delivery of said one or more messages.

2. The method of claim 1, wherein said reconfiguring comprises changing from a first routing path between one node of said publish/subscribe system and another node of said publish/subscribe system to a second routing path between said one node and said another node.

3. The method of claim 2, wherein said first path is designated in a first routing table and said second path is designated in a second routing table and wherein said changing comprises selecting said second routing table.

4. The method of claim 1, wherein said initiating comprises forwarding a reconfiguration request from a configuration manager to one or more nodes of said publish/subscribe system.

5. The method of claim 1, wherein said reconfiguring comprises:
    selecting a new routing path to be used in forwarding one or more messages within said publish/subscribe system; and
    updating one or more data structures associated with one or more nodes of said publish/subscribe system to reflect said reconfiguring.

6. The method of claim 1, further comprising forwarding a message from at least one node of said publish/subscribe system to at least one other node of said publish/subscribe system, after said reconfiguration is initiated and prior to completion of said reconfiguration.

7. The method of claim 6, further comprising determining whether an old routing path or a new routing path is to be used in forwarding said message.

8. The method of claim 7, further comprising forwarding another message from at least one node of said publish/subscribe system to at least one other node of said publish/subscribe system, wherein said another message is forwarded using a different routing path than said message.

9. The method of claim 6, wherein said message comprises a CS-message, and wherein said method further comprises refraining from delivering said CS-message to a node of said publish/subscribe system, until after one or more other messages are at least ready for delivery to said node, such that ordering of delivery of said CS-message is preserved.

10. The method of claim 9, wherein said one or more other messages are forwarded to said node via an old routing path and said CS-message is forwarded to said node via a new routing path.

11. The method of claim 9, further comprising transferring said CS-message from a held queue to a delivery queue, such that said CS-message can be delivered, after an originating node of said CS-message has completed forwarding to said delivery queue any messages forwarded to said node via an old path.

12. The method of claim 6, wherein said message comprises an SC-message, and wherein said method further comprises refraining from delivering said SC-message to a node of said publish/subscribe system, when a new routing path is used for said SC-message, until a predefined event occurs.

13. The method of claim 12, wherein said predefined event comprises receipt of a switch message at said node.

14. The method of claim 13, further comprising transferring said SC-message from a held queue to a delivery queue, as a result of said receipt of said switch message, such that said SC-message can be delivered.

15. A system of reconfiguring publish/subscribe systems, said system comprising:

means for initiating a reconfiguration of a publish/subscribe system; and means for reconfiguring said publish/subscribe system, wherein no messages of said publish/subscribe system are lost during the reconfiguring;

wherein the reconfiguring is non-disruptive to said publish/subscribe system, wherein said publish/subscribe system comprises an ordering requirement for delivery of one or more messages from at least one node to at least one other node of said publish/subscribe system, and wherein said means for reconfiguring preserves said ordering of delivery of said one or more messages.

16. The system of claim 15, wherein said means for reconfiguring comprises means for changing from a first routing path between one node of said publish/subscribe system and another node of said publish/subscribe system to a second routing path between said one node and said another node.

17. The system of claim 16, wherein said first path is designated in a first routing table and said second path is designated in a second routing table and wherein said means for changing comprises means for selecting said second routing table.

18. The system of claim 15, wherein said means for initiating comprises means for forwarding a reconfiguration request from a configuration manager to one or more nodes of said publish/subscribe system.

19. The system of claim 15, wherein said means for reconfiguring comprises:

means for selecting a new routing path to be used in forwarding one or more messages within said publish/subscribe system; and means for updating one or more data structures associated with one or more nodes of said publish/subscribe system to reflect said reconfiguring.

20. The system of claim 15, further comprising means for forwarding a message from at least one node of said publish/subscribe system to at least one other node of said publish/subscribe system, after the reconfiguration is initiated.

21. The system of claim 20, further comprising means for determining whether an old routing path or a new routing path is to be used in forwarding said message.

22. The system of claim 21, further comprising means for forwarding another message from at least one node of said publish/subscribe system to at least one other node of said publish/subscribe system, wherein said another message is forwarded using a different routing path than said message.

23. The system of claim 20, wherein said message comprises a CS-message, and wherein said system further comprises means for refraining from delivering said CS-message to a node of said publish/subscribe system, until after one or more other messages are at least ready for delivery to said node, such that ordering of delivery of said CS-message is preserved.

24. The system of claim 23, wherein said one or more other messages are forwarded to said node via an old routing path and said CS-message is forwarded to said node via a new routing path.

25. The system of claim 23, further comprising means for transferring said CS-message from a held queue to a delivery queue, such that said CS-message can be delivered, after an originating node of said CS-message has completed forwarding to said delivery queue any messages forwarded to said node via an old path.

26. The system of claim 20, wherein said message comprises an SC-message, and wherein said system further comprises means for refraining from delivering said SC-message to a node of said publish/subscribe system, when a new routing path is used for said SC-message, until a predefined event occurs.

27. The system of claim 26, wherein said predefined event comprises receipt of a switch message at said node.

28. The system of claim 27, further comprising means for transferring said SC-message from a held queue to a delivery queue, as a result of said receipt of said switch message, such that said SC-message can be delivered.

29. A system of reconfiguring publish/subscribe systems, said system comprising:

a configuration manager adapted to initiate a reconfiguration of a publish/subscribe system; and one or more nodes of said publish/subscribe system adapted to reconfigure said publish/subscribe system, wherein no messages of said publish/subscribe system are lost during the reconfiguring;

wherein the one or more nodes are adapted to non-disruptively reconfigure said publish/subscribe system, wherein said publish/subscribe system comprises an ordering requirement for delivery of one or more messages from at least one node to at least one other node of said publish/subscribe system, and wherein the one or more nodes are further adapted to preserve said ordering of delivery of said one or more messages.

30. The system of claim 29, wherein said configuration manager is adapted to forward a reconfiguration request to one or more nodes of said publish/subscribe system to initiate said reconfiguration.

31. The system of claim 29, further comprising at least one node of said publish/subscribe system adapted to forward a message to at least one other node of said publish/subscribe system, after said reconfiguration is initiated.

32. An article of manufacture, comprising:

at least one computer usable medium having computer readable program code means embodied therein for causing the reconfiguring of publish/subscribe systems, the computer readable program code means in said article of manufacture comprising:

computer readable program code means for causing a computer to initiate a reconfiguration of a publish/subscribe system; and computer readable program code means for causing a computer to non-disruptively reconfigure said publish/subscribe system, wherein no messages of said publish/subscribe system are lost during the reconfiguring;

wherein said publish/subscribe system comprises an ordering requirement for delivery of one or more messages from at least one node to at least one other node of said publish/subscribe system, and wherein said computer readable program code means for causing a computer to reconfigure preserves said ordering of delivery of said one or more messages.

33. The article of manufacture of claim 32, wherein said computer readable program code means for causing a computer to reconfigure comprises computer readable program code means for causing a computer to change from a first routing path between one node of said publish/subscribe system and another node of said publish/subscribe system to a second routing path between said one node and said another node.

34. The article of manufacture of claim 32, further comprising computer readable program code means for causing a computer to forward a message from at least one node of said publish/subscribe system to at least one other node of said publish/subscribe system, after said reconfiguration is initiated.

35. At least one program storage device readable by a computer, tangibly embodying at least one program of instructions executable by the computer to perform a method of reconfiguring publish/subscribe systems, said method comprising:

initiating a reconfiguration of a publish/subscribe system; and reconfiguring said publish/subscribe system, wherein no messages of said publish/subscribe system are lost during said reconfiguring;

wherein said reconfiguring is non-disruptive to said publish/subscribe system, wherein said publish/subscribe system comprises an ordering requirement for delivery of one or more messages from at least one node to at least one other node of said publish/subscribe system, and wherein said reconfiguring preserves said ordering of delivery of said one or more messages.

* * * * *